(12) United States Patent
Drew

(10) Patent No.: US 7,361,046 B2
(45) Date of Patent: Apr. 22, 2008

(54) DISPLAY ASSEMBLY

(75) Inventor: Paul L. Drew, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 47 days.

(21) Appl. No.: 11/173,064

(22) Filed: Jul. 1, 2005

(65) Prior Publication Data

US 2007/0002529 A1 Jan. 4, 2007

(51) Int. Cl.
*H01R 13/502* (2006.01)
(52) U.S. Cl. .................. 439/353; 248/917; 439/651
(58) Field of Classification Search ............... 439/701, 439/403, 402, 651; 248/917; 361/681, 682, 361/683, 679
See application file for complete search history.

(56) References Cited

U.S. PATENT DOCUMENTS

| | | | | |
|---|---|---|---|---|
| 4,544,122 A | * | 10/1985 | Bumgardner | 248/346.01 |
| 4,880,191 A | * | 11/1989 | Lake, Jr. | 248/371 |
| 5,157,585 A | * | 10/1992 | Myers | 361/680 |
| 5,685,441 A | * | 11/1997 | Calfee | 211/194 |
| 6,343,006 B1 | * | 1/2002 | Moscovitch et al. | 361/681 |
| 6,573,453 B2 | * | 6/2003 | Takada et al. | 174/72 A |
| 6,645,003 B2 | * | 11/2003 | Yoshida et al. | 439/507 |
| 2004/0190236 A1 | | 9/2004 | Medica | |
| 2004/0203282 A1 | | 10/2004 | Lim | |
| 2005/0088808 A1 | | 4/2005 | Michoux | |

* cited by examiner

*Primary Examiner*—Neil Abrams
*Assistant Examiner*—Phuongchi Nguyen

(57) ABSTRACT

In one embodiment, a display assembly comprises a base, a monitor assembly, and a first spacing connector having a first interlocking mechanism selectively connectable to the base and a second interlocking mechanism selectively connectable to the monitor assembly to provide structural support for the monitor assembly.

15 Claims, 3 Drawing Sheets

DISPLAY ASSEMBLY

BACKGROUND

Users of computing equipment may have different preferences regarding the height of their computer monitor. Mechanisms to establish the height of a monitor assembly at varying height find utility.

SUMMARY

In one embodiment, a display assembly comprises a base, a monitor assembly, and a first spacing connector having a first interlocking mechanism selectively connectable to the base and a second interlocking mechanism selectively connectable to the monitor assembly to provide structural support for the monitor assembly.

DETAILED DESCRIPTION

Described herein are embodiments of a display assembly. In the description herein numerous specific details are provided, such as examples of components and/or methods, to provide a thorough understanding of the display assembly. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments.

Figure 1:
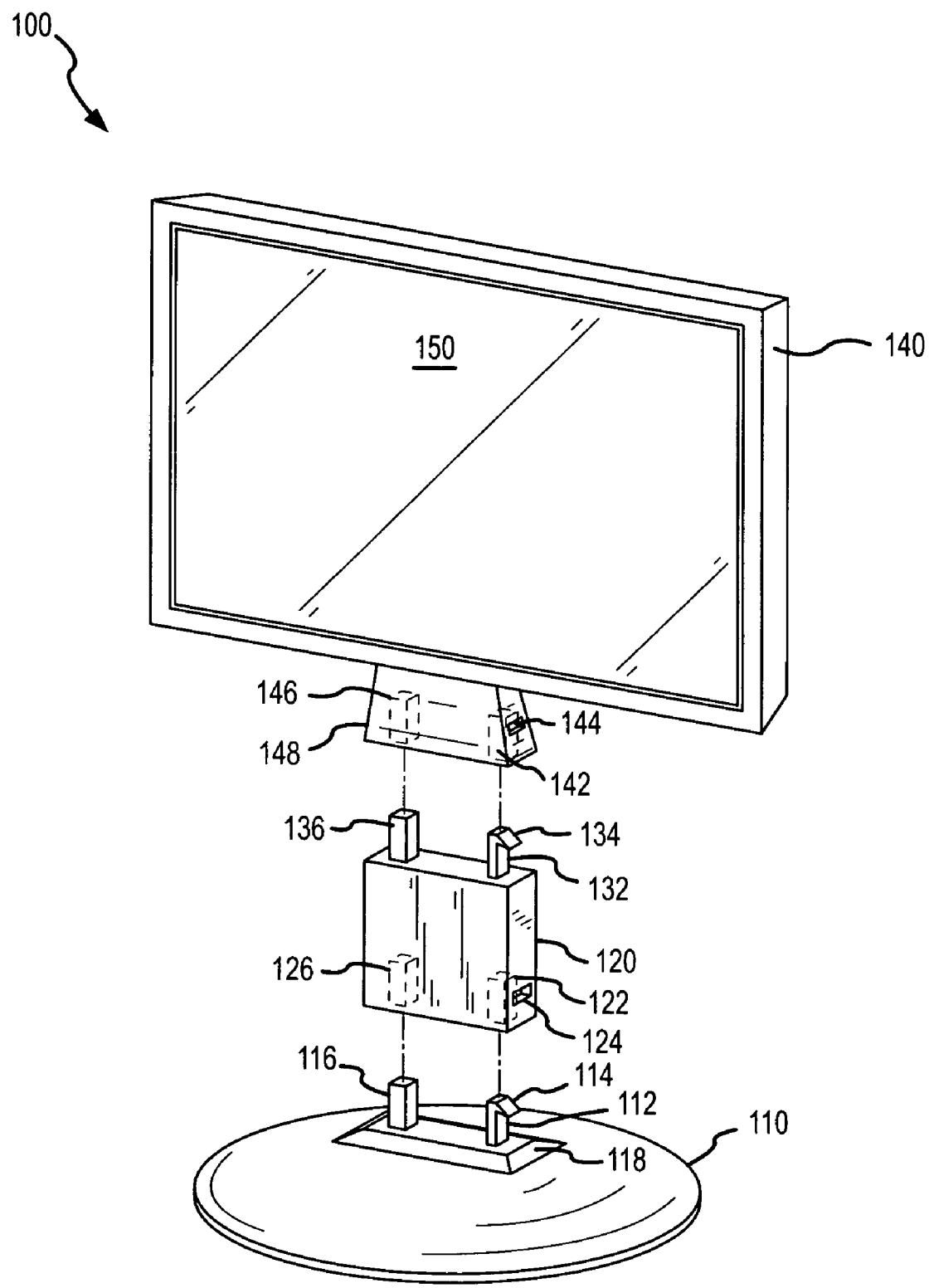
FIG. 1 is a perspective view of a display assembly, according to an embodiment.

FIG. 1 is a perspective view of a display assembly 100, according to an embodiment. Referring to FIG. 1, display assembly 100 includes a base 110, a monitor assembly 140, and a spacing connector 120 that is selectively connectable to the base 110 and the monitor assembly 140 to provide structural support for the monitor assembly 140.

In the embodiment depicted in FIG. 1, base 110 includes an alignment member 112 connected to the base 110 at a proximal end and including a hook-shaped protuberance 114 at a distal end thereof. Base 110 further may include another alignment member 116 connected to the base 110 at a proximal end. Alignment member 116 may include a similar hook-shaped protuberance in an alternate embodiment. Alignment members 112, 116 may be integrally formed with the base 110 from a suitable material such as, e.g., an injection molded polymer. Alternatively, alignment members 112, 116 may be formed separately from base 110 and secured to base 110 using suitable fastener such as, e.g., screws, rivets, a hook-and loop material, or the like. The proximal ends of the alignment members 112, 116 are secured to the base, either directly or by way of a mounting plate 118 that is, in turn secured to the base 110.

In the embodiment depicted in FIG. 1, a spacing connector 120 is selectively connectable to the base 110. The body of spacing connector 120 includes an alignment channel 122 that is adapted to receive the alignment member 112. In one embodiment, the body of spacing connector 120 further includes an aperture 124 in the alignment channel 122 that is adapted to receive the hook 114 of the alignment member 112 to facilitate a secure connection between spacing connector 120 and base 110. In one embodiment, the body of spacing connector 120 may include another alignment channel 126 that is adapted to receive alignment member 116. In an alternate embodiment in which the alignment member 116 includes a hook-shaped protuberance, the body of spacing connector 120 may include an aperture in the alignment channel 126 to receive the hook-shaped protuberance.

In the embodiment depicted in FIG. 1, spacing connector 120 includes an alignment member 132 connected to the spacing connector 120 at a proximal end and including a hook-shaped protuberance 134 at a distal end thereof. Spacing connector 120 further may include another alignment member 136 connected to the spacing connector 120 at a proximal end. Alignment member 136 may include a similar hook-shaped protuberance in an alternate embodiment. Alignment members 132, 136 may be integrally formed with the spacing connector 120 from a suitable material such as, e.g., an injection molded polymer. Alternatively, alignment members 132, 136 may be formed separately from spacing connector 120 and secured to spacing connector 120 using suitable fastener such as, e.g., screws, rivets, a hook-and loop material, or the like.

Monitor assembly 140 includes a screen 150 that may be implemented, e.g., as a flat-panel screen or a cathode ray tube (CRT) screen, or the like. In the embodiment depicted in FIG. 1, monitor assembly 140 includes a mounting bracket 148 that defines an alignment channel 142 that is adapted to receive the alignment member 112. In one embodiment, mounting bracket 148 further includes an aperture 144 in the alignment channel 142 that is adapted to receive the hook 134 of the alignment member 132 to facilitate a secure connection between monitor assembly 140 and spacing connector 120. In one embodiment, the mounting bracket 148 may include another alignment channel 146 that is adapted to receive alignment member 136. In an alternate embodiment in which the alignment member 136 includes a hook-shaped protuberance, the mounting bracket 148 may include an aperture in the alignment channel 146 to receive the hook-shaped protuberance.

The display assembly 100 may be assembled by connecting the spacing connector 120 to the base 110, then connecting the monitor assembly 140 to the spacing connector. Alternatively, the spacing connector 120 may be connected to the monitor assembly 140 first, then connected to the base 110.

Figure 2:
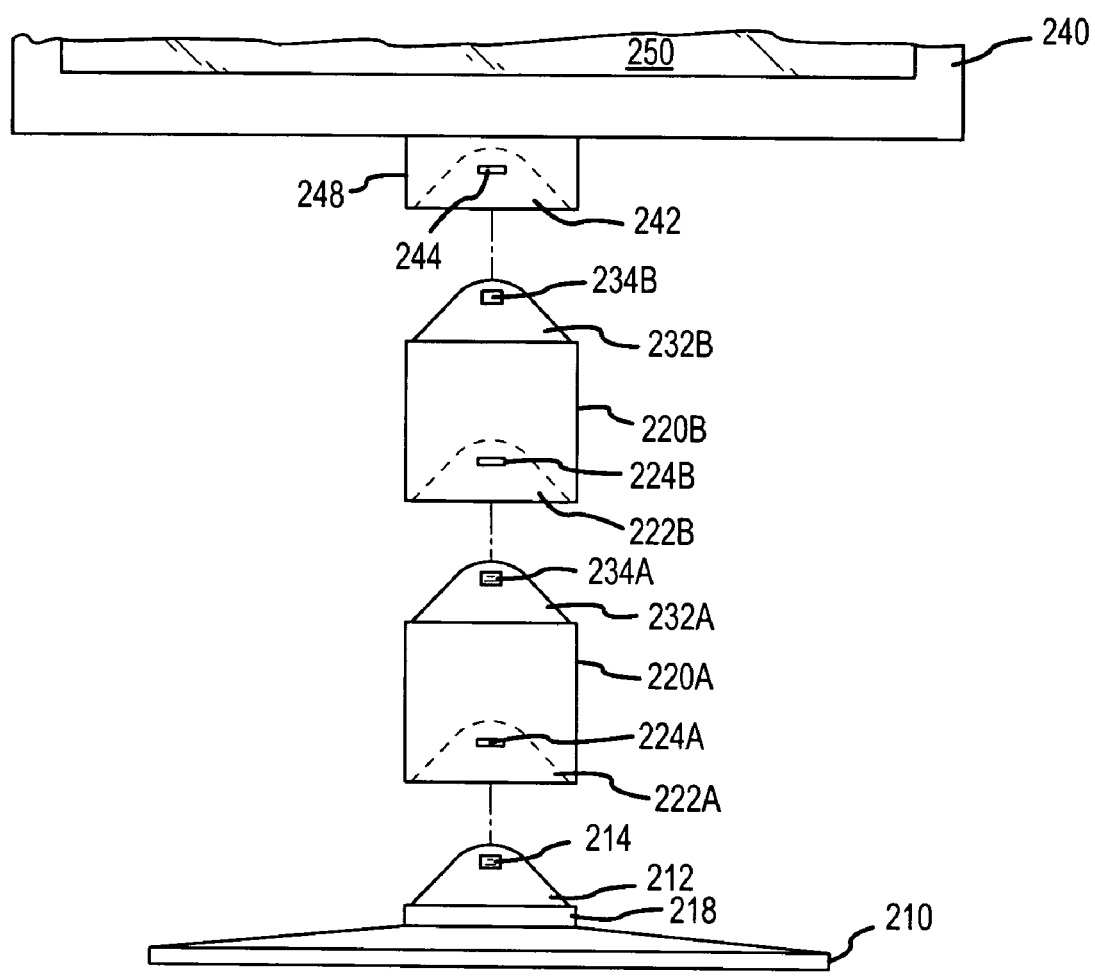
FIG. 2 is a front, exploded view of a display assembly, according to an embodiment.

FIG. 2 is a front, exploded view of a display assembly 200, according to an embodiment. Referring to FIG. 2, display assembly 200 includes a base 210, a monitor assembly 240, and a spacing connectors 220A, 220B that are selectively connectable to the base 110 and the monitor assembly to provide structural support for the monitor assembly 240.

In the embodiment depicted in FIG. 2, base 210 includes an alignment member 212 connected to the base 210 at a proximal end and including a hook-shaped protuberance 214 near a distal end thereof. In the embodiment depicted in FIG. 2, alignment member 212 is embodied as a substantially triangular-shaped member. Alignment member 212 may be integrally formed with the base 210 from a suitable material such as, e.g., an injection molded polymer. Alternatively, alignment member 212 may be formed separately from base 210 and secured to base 210 using suitable fastener such as, e.g., screws, rivets, a hook-and loop material, or the like. The proximal end of the alignment members 212 is secured to the base, either directly or by way of a mounting plate 218 that is, in turn secured to the base 210.

In the embodiment depicted in FIG. 2, a first spacing connector 220A is selectively connectable to the base 210. The body of spacing connector 220A includes an alignment channel 222A that is adapted to receive the alignment member 212. In one embodiment, the body of spacing connector 220A further includes an aperture 224A in the alignment channel 222A that is adapted to receive the hook 214 of the alignment member 212 to facilitate a secure connection between spacing connector 220A and base 210.

In the embodiment depicted in FIG. 2, spacing connector 220A includes an alignment member 232A connected to the spacing connector 220A at a proximal end and including a hook-shaped protuberance 234A at a distal end thereof. Alignment member 232A may be integrally formed with the spacing connector 220A from a suitable material such as, e.g., an injection molded polymer. Alternatively, alignment member 232A may be formed separately from spacing connector 220A and secured to spacing connector 220A using suitable fastener such as, e.g., screws, rivets, a hook-and loop material, or the like.

In the embodiment depicted in FIG. 2, a second spacing connector 220B is selectively connectable to the base 210. Second spacing connector 220B may have a configuration similar to first spacing connector 220A. Analogous components are assigned common reference numerals in FIG. 2. Second spacing connector 220B may be the same size as, longer than, or shorter than first spacing connector 220A.

Monitor assembly 240 includes a screen 250 that may be implemented, e.g., as a flat-panel screen or a cathode ray tube (CRT) screen, or the like. In the embodiment depicted in FIG. 2, monitor assembly 240 includes a mounting bracket 248 that defines an alignment channel 242 that is adapted to receive the alignment member 232B of second spacing connector 220B. In one embodiment, mounting bracket 248 further includes an aperture 244 in the alignment channel 242 that is adapted to receive the hook 234B of the alignment member 232B to facilitate a secure connection between monitor assembly 240 and second spacing connector 220B.

The display assembly 200 may be assembled by connecting the first spacing connector 220A to the base 210, then connecting the second spacing connector 220B to the first spacing connector 220A, and connecting the monitor assembly 140 to the second spacing connector 220B. Alternatively, the spacing connectors 220A, 220B may be connected to the monitor assembly 240 first, then connected to the base 210.

In one embodiment, one or more spacing connectors may be distributed as a kit to connect a monitor assembly to a base. The kit may be distributed with a monitor assembly, or as a separate set of components.

In alternate embodiments, the interlocking members and channels may be configured in different manners. For example, the monitor assembly 140 may be configured with one or more alignment members and the spacing connector (s) may be adapted with channels to receive the alignment members. Further, alternate interlocking mechanisms may be implemented. For example, the spacing connector(s) may be connected to the base and the monitor assembly by screws, tongue and groove connectors, snap-fit connectors, or the like.

Figure 3:
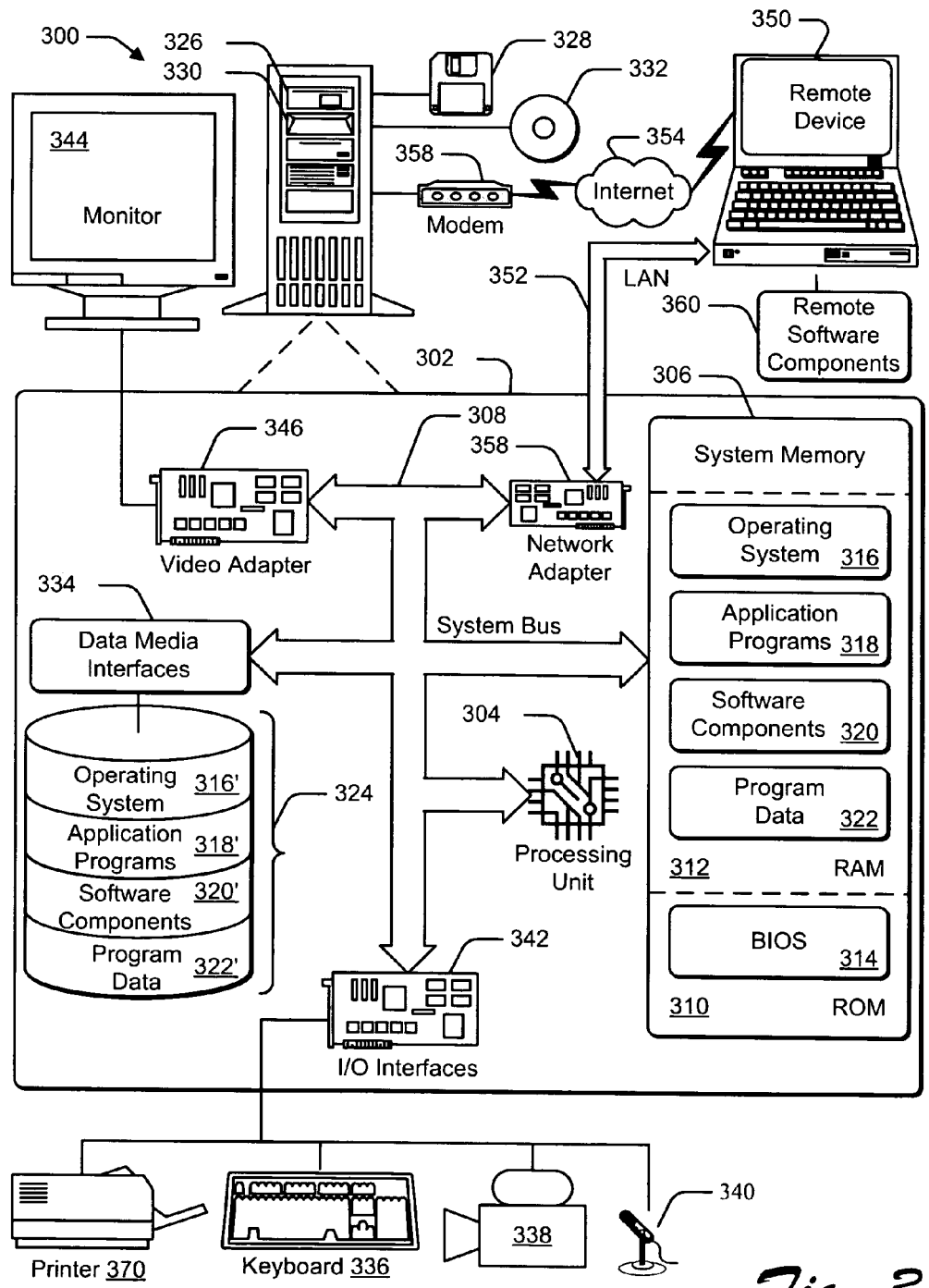
FIG. 3 is a schematic illustration of a computing system, according to an embodiment.

In another embodiment, a display assembly may be distributed as a component of a computer system. FIG. 3 is a schematic illustration of a computing system, according to an embodiment. The components shown in FIG. 3 are only examples, and are not intended to suggest any limitation as to the scope of the functionality of the invention; the invention is not necessarily dependent on the features shown in FIG. 3.

Generally, various different general purpose or special purpose computing system configurations can be used. Examples of well known computing systems, environments, and/or configurations that may be suitable for use with the invention include, but are not limited to, personal computers, server computers, hand-held or laptop devices, multi-processor systems, microprocessor-based systems, set top boxes, programmable consumer electronics, network PCs, minicomputers, mainframe computers, distributed computing environments that include any of the above systems or devices, and the like.

With reference to FIG. 3, the components of computer 300 may include, but are not limited to, a processing unit 304, a system memory 306, and a system bus 308 that couples various system components including the system memory 306 to the processing unit 304. The system bus 308 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 300 typically includes a variety of computer-readable media. Computer-readable media can be any available media that can be accessed by computer 300 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 300. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 306 includes computer storage media in the form of volatile and/or nonvolatile memory such as read only memory (ROM) 310 and random access memory (RAM) 312. A basic input/output system 314 (BIOS), containing the basic routines that help to transfer information between elements within computer 300, such as during start-up, is typically stored in ROM 310. RAM 312 typically contains data and/or program modules that are immediately accessible to and/or presently being operated on by processing unit 304. By way of example, and not limitation, FIG. 3 illustrates operating system 316, application programs 318, other software components 320, and program data 322.

The computer 300 may also include other removable/non-removable, volatile/nonvolatile computer storage media. By way of example only, the computer system of FIG. 3 may include a hard disk drive 324 that reads from or writes to non-removable, nonvolatile magnetic media, a magnetic disk drive 326 that reads from or writes to a removable, nonvolatile magnetic disk 328, and an optical disk drive 330 that reads from or writes to a removable, nonvolatile optical disk 332 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 324 is typically connected to the system bus 308 through a non-removable memory interface such as data media interface 334, and magnetic disk drive 326 and optical disk drive 330 are typically connected to the system bus 308 by a removable memory interface.

The drives and their associated computer storage media discussed above and illustrated in FIG. 3 provide storage of computer-readable instructions, data structures, program modules, and other data for computer 300. In FIG. 3, for example, hard disk drive 324 is illustrated as storing operating system 316', application programs 318', software components 320', and program data 322'. Note that these components can either be the same as or different from operating system 316, application programs 318, software components 320, and program data 322. Operating system 316, application programs 318, other program modules 320, and program data 322 are given different numbers here to illustrate that, at a minimum, they are different copies. A user may enter commands and information into the computer 300 through input devices such as a keyboard 336 and pointing device 338, commonly referred to as a mouse, trackball, or touch pad. Other input devices (not shown) may include a microphone 340, joystick, game pad, satellite dish, scanner, or the like. These and other input devices are often connected to the processing unit 304 through an input/output (I/O) interface 342 that is coupled to the system bus, but may be connected by other interface and bus structures, such as a parallel port, game port, or a universal serial bus (USB). A monitor 344 or other type of display device is also connected to the system bus 306 via an interface, such as a video adapter 346. In addition to the monitor 344, computers may also include other peripheral output devices (e.g., speakers) and one or more printers 370, which may be connected through the I/O interface 342.

The computer may operate in a networked environment using logical connections to one or more remote computers, such as a remote computing device 350. The remote computing device 350 may be a personal computer, a server, a router, a network PC, a peer device or other common network node, and typically includes many or all of the elements described above relative to computer 300. The logical connections depicted in FIG. 3 include a local area network (LAN) 352 and a wide area network (WAN) 354. Although the WAN 354 shown in FIG. 3 is the Internet, the WAN 354 may also include other networks. Such networking environments are commonplace in offices, enterprise-wide computer networks, intranets, and the like.

When used in a LAN networking environment, the computer 300 is connected to the LAN 352 through a network interface or adapter 356. When used in a WAN networking environment, the computer 300 typically includes a modem 358 or other means for establishing communications over the Internet 354. The modem 358, which may be internal or external, may be connected to the system bus 306 via the I/O interface 342, or other appropriate mechanism. In a networked environment, program modules depicted relative to the computer 300, or portions thereof, may be stored in the remote computing device 350. By way of example, and not limitation, FIG. 3 illustrates remote application programs 360 as residing on remote computing device 350. It will be appreciated that the network connections shown are exemplary and other means of establishing a communications link between the computers may be used.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A display assembly, comprising:
   a base having a first interlocking assembly;
   a monitor assembly having a second interlocking assembly; and
   a first spacing connector having a third interlocking assembly on a first end and a fourth interlocking assembly on a second end;
   wherein the first interlocking assembly on the base is selectively connectable to the second interlocking assembly on the monitor when the display is in a first configuration, and
   wherein the first interlocking assembly on the base is selectively connectable to third interlocking assembly on the first spacing connector and the second interlocking assembly on the monitor assembly is connectable to the fourth interlocking assembly when the display assembly is in a second configuration;
   wherein the base comprises a first alignment member and the first spacing connector comprises a first alignment channel to receive the first alignment member;
   the first alignment member comprises a hook; and
   the first spacing connector includes an aperture in the first alignment channel to receive the hook.

2. The display assembly of claim 1, wherein:
   the base comprises a third alignment member; and
   the first spacing connector comprises a second alignment channel to receive the third alignment member.

3. The display assembly of claim 1, wherein:
   the first spacing connector comprises a fourth alignment member; and
   the monitor assembly comprises a second alignment channel to receive the fourth alignment member.

4. The display assembly of claim 1, further comprising a second spacing connector having a first interlocking assembly selectively connectable to the base or the first spacing connector and a second interlocking assembly selectively connectable to the monitor assembly to provide structural support for the monitor assembly.

5. The display assembly of claim 1, wherein the first spacing connector comprises a second alignment member and the monitor assembly comprises a first alignment channel to receive the second alignment member.

6. The display assembly of claim 5, wherein:
the second alignment member comprises a hook; and
the monitor assembly includes an aperture in the first alignment channel to receive the hook.

7. A display assembly comprising:
a base having a first interlocking assembly;
a monitor assembly having a second interlocking assembly; and
a kit for connecting the base and the monitor assembly, wherein the kit comprises a first spacing connector having a third interlocking assembly on a first end and a fourth interlocking assembly on a second end;
wherein the first interlocking assembly on the base is selectively connectable to the second interlocking assembly on the monitor when the display is in a first configuration, and
wherein the first interlocking assembly on the base is selectively connectable to third interlocking assembly on the first spacing connector and the second interlocking assembly on the monitor assembly is connectable to the fourth interlocking assembly when the display assembly is in a second configuration;
wherein the first spacing connector is selectively connectable to a second spacing connector;
wherein the base comprises a first alignment member and the first spacing connector comprises a first alignment channel to receive the first alignment member; and
wherein:
the first alignment member comprises a hook; and
the first spacing connector includes an aperture in the first alignment channel to receive the hook.

8. The display assembly of claim 7, wherein the second spacing connector comprises a second alignment member and the monitor assembly comprises a first alignment channel to receive the second alignment member.

9. The display assembly of claim 8, wherein:
the second alignment member comprises a hook; and
the monitor assembly includes an aperture in the first alignment channel to receive the hook.

10. A computer system, comprising:
a computer; and
a display assembly comprising:
a base having a first interlocking assembly;
a monitor assembly having a second interlocking assembly; and
a kit for connecting the base and the monitor assembly, wherein the kit comprises a first spacing connector having a third interlocking assembly on a first end and a fourth interlocking assembly on a second end;
wherein the first interlocking assembly on the base is selectively connectable to the second interlocking assembly on the monitor when the display is in a first configuration, and
wherein the first interlocking assembly on the base is selectively connectable to third interlocking assembly on the first spacing connector and the second interlocking assembly on the monitor assembly is connectable to the fourth interlocking assembly when the display assembly is in a second configuration;
wherein the first spacing connector is selectively connectable to a second spacing connector;
wherein the base comprises a first alignment member and the first spacing connector comprises a first alignment channel to receive the first alignment member; and
wherein:
the first alignment member comprises a hook; and
the first spacing connector includes an aperture in the first alignment channel to receive the hook.

11. The computer system of claim 10, wherein the second spacing connector comprises a second alignment member and the monitor assembly comprises a first alignment channel to receive the second alignment member.

12. The computer system of claim 11, wherein:
the second alignment member comprises a hook; and
the monitor assembly includes an aperture in the first alignment channel to receive the hook.

13. A display assembly, comprising:
a base having a first interlocking assembly;
a monitor assembly having a second interlocking assembly; and
means for connecting the base and the monitoring assembly, the means including a first spacing connector having a third interlocking assembly on a first end and a fourth interlocking assembly on a second end;
wherein the first interlocking assembly on the base is selectively connectable to the second interlocking assembly on the monitor when the display is in a first configuration, and
wherein the first interlocking assembly on the base is selectively connectable to third interlocking assembly on the first spacing connector and the second interlocking assembly on the monitor assembly is connectable to the fourth interlocking assembly when the display assembly is in a second configuration;
wherein the base comprises a first alignment member and the first spacing connector comprises a first alignment channel to receive the first alignment member; and
wherein:
the first alignment member comprises a hook; and
the first spacing connector includes an aperture in the first alignment channel to receive the hook.

14. The display assembly of claim 13, wherein the first spacing connector comprises a second alignment member and the monitor assembly comprises a first alignment channel to receive the second alignment member.

15. The display assembly of claim 14, wherein:
the second alignment member comprises a hook; and
the monitor assembly includes an aperture in the first alignment channel to receive the hook.

* * * * *